US012799973B2

(12) United States Patent
Gowda et al.

(10) Patent No.: US 12,799,973 B2
(45) Date of Patent: Nov. 17, 2026

(54) ADJUSTABLE PROTECTIVE CAP ARRANGEMENT FOR A BALL JOINT IN A VEHICLE

(71) Applicant: Volvo Truck Corporation, Gothenburg (SE)

(72) Inventors: Jithendra Gowda, Vignan Nagar (IN); Girish Alaje, Sullia (IN)

(73) Assignee: Volvo Truck Corporation, Gothenburg (SE)

( * ) Notice: Subject to any disclaimer, the term of this patent is extended or adjusted under 35 U.S.C. 154(b) by 729 days.

(21) Appl. No.: 18/322,720

(22) Filed: May 24, 2023

(65) Prior Publication Data

US 2023/0417273 A1 Dec. 28, 2023

(30) Foreign Application Priority Data

Jun. 23, 2022 (EP) .................................... 22180749

(51) Int. Cl.
*F16B 37/14* (2006.01)
*F16C 11/06* (2006.01)

(52) U.S. Cl.
CPC .......... *F16C 11/0671* (2013.01); *F16B 37/14* (2013.01); *F16C 2326/24* (2013.01)

(58) Field of Classification Search
CPC ....................................................... F16B 37/14
USPC ........................... 411/372.5, 372.6, 373, 374
See application file for complete search history.

(56) References Cited

U.S. PATENT DOCUMENTS 1,651,187 A * 11/1927 Cole ........................ F16B 39/10 411/326
3,389,928 A 6/1968 Wehner
4,784,555 A * 11/1988 Cantrell .................. F16B 37/14 403/372

(Continued)

FOREIGN PATENT DOCUMENTS

GB 134709 A 11/1919
JP 2001165138 A 6/2001

(Continued)

OTHER PUBLICATIONS

Extended European Search Report for European Patent Application No. 22180749.8, mailed Nov. 18, 2022, 9 pages.

(Continued)

*Primary Examiner* — Flemming Saether
(74) *Attorney, Agent, or Firm* — Withrow & Terranova, PLLC

(57) ABSTRACT

An adjustable protective cap arrangement for a ball joint in a vehicle, comprising a main part and a cap part. The main part is configured to surround a ball joint lock nut, the main part having a central through hole which extends axially through the main part and which is configured to receive a portion of a ball joint stud projecting through and beyond the ball joint lock nut. The cap part is configured to be connected to an end portion of the main part to form a closed end of the protective cap arrangement. When the cap part has been connected to the main part, the height of the protective cap arrangement is adjustable by adjustment of the axial position of the cap part relative to the main part, thereby enabling accommodation of different ball joint stud heights.

14 Claims, 5 Drawing Sheets

(56) References Cited

U.S. PATENT DOCUMENTS

| | | | | | |
|---|---|---|---|---|---|
| 4,890,967 | A * | 1/1990 | Rosenbaum | F16B 37/14 411/910 |
| 5,022,779 | A | 6/1991 | Schnitzler | |
| 5,028,093 | A * | 7/1991 | Nason | B60B 7/00 411/428 |
| 5,082,409 | A * | 1/1992 | Bias | F16B 37/14 411/372.5 |
| 5,205,614 | A * | 4/1993 | Wright | B60B 7/14 301/37.374 |
| 5,752,795 | A * | 5/1998 | D'Adamo | F16B 37/14 411/429 |
| 6,076,840 | A | 6/2000 | Kincaid et al. | |
| 6,135,691 | A * | 10/2000 | Nadarajah | F16B 37/14 411/428 |
| 6,629,810 | B1 * | 10/2003 | Heintges | F16B 37/14 411/372.6 |
| 7,384,225 | B2 * | 6/2008 | Woolstencroft | F16B 37/14 411/372.6 |
| 8,051,690 | B2 * | 11/2011 | Camisasca | F16B 41/00 70/229 |
| 9,283,904 | B2 * | 3/2016 | Parenti | F16B 21/12 |
| 9,416,810 | B2 * | 8/2016 | Swinderman | B25B 23/12 |
| 10,040,568 | B2 * | 8/2018 | Rebbeck | B64D 45/02 |
| 10,119,562 | B2 | 11/2018 | Boerschig | |
| 10,655,667 | B2 * | 5/2020 | Stevens | F16B 33/004 |
| 2005/0008451 | A1 * | 1/2005 | Groppo | F16B 37/14 411/431 |
| 2021/0071703 | A1 | 3/2021 | Mahaffey | |

FOREIGN PATENT DOCUMENTS

| | | | |
|---|---|---|---|
| JP | 2019108906 | A | 7/2019 |
| JP | 2019196814 | A | 11/2019 |
| KR | 20160107475 | A | 9/2016 |

OTHER PUBLICATIONS

Examination Report for European Patent Application No. 22180749.8, mailed Nov. 6, 2025, 6 pages.

* cited by examiner

ADJUSTABLE PROTECTIVE CAP ARRANGEMENT FOR A BALL JOINT IN A VEHICLE

RELATED APPLICATIONS

The present application claims priority to European Patent Application No. 22180749.8, filed on Jun. 23, 2022, and entitled "ADJUSTABLE PROTECTIVE CAP ARRANGEMENT FOR A BALL JOINT IN A VEHICLE," which is incorporated herein by reference in its entirety.

TECHNICAL FIELD

The present disclosure relates to an adjustable protective cap arrangement for a ball joint in a vehicle. The present disclosure also relates to a vehicle comprising such an adjustable protective cap arrangement.

The teaching of the present disclosure can be applied in heavy-duty vehicles, such as trucks, buses and construction equipment. Although the main focus of this disclosure will be described with respect to a heavy-duty vehicle, the teachings hearing may be implemented for other vehicles as well, such as cars.

BACKGROUND

Vehicles may be provided with various ball joints. For example, steering linkages, such as drag links and tie rods, may be provided with ball joints. Such ball joints commonly comprise a ball joint stud, around which a ball joint lock nut may be engaged by cooperating threads. In order to reduce the risk of corrosion formation at the interface between with ball joint stud and the ball joint lock nut and the ensuing risk of loosening the interconnection between the two components, it is known to provide a protective cap which covers the ball joint lock nut and the ball joint stud. However, when vehicle manufactures develop new vehicles, models or components, they may sometimes also choose to use different ball joints. If the chosen ball joint has a ball joint stud which has a different height compared to the previous one, then a new protective cap also needs to be developed so that it has the appropriate height for covering the new ball joint stud. A too small existing protective cap will not fit a ball joint stud having a greater height. On the other hand, it is not desirable to have an oversized and bulky protective cap if the new ball joint stud has a lower height.

It is clearly desirable to maintain the freedom of choice when it comes to selecting appropriately sized ball joint studs. At the same time, it is highly desirable to simplify the approach that is currently used for providing protection against corrosion for the different heights of ball joint studs.

SUMMARY

An object of the general inventive concept is to provide an adjustable protective cap arrangement which at least partly alleviates the drawbacks of the currently used approach discussed above. This and other objects, which will become apparent in the following discussion, are accomplished by an adjustable protective cap arrangement as defined in the accompanying independent claim. Some non-limiting exemplary embodiments are presented in the dependent claims.

The inventors have realized that by decoupling the traditional single-component protective cap into a multi-part (i.e., at least two parts) protective cap arrangement, and allowing the parts to be positionally adjusted relative to each other, the protective-cap arrangement can be used for protecting ball joints of various different ball joint stud heights. In particular, by allowing an axial adjustment of one part relative to another, the height of protective-cap arrangement may be conveniently adapted to the height of the specific ball joint stud you wish to cover.

According to a first aspect of the present disclosure, there is provided an adjustable protective cap arrangement for a ball joint in a vehicle, comprising:

- a main part configured to surround a ball joint lock nut, the main part having a central through hole which extends axially through the main part and which is configured to receive a portion of a ball joint stud projecting through and beyond the ball joint lock nut, and
- a cap part configured to be connected to an end portion of the main part to form a closed end of the protective cap arrangement, wherein, when the cap part has been connected to the main part, the height of the protective cap arrangement is adjustable by adjustment of the axial position of the cap part relative to the main part, thereby enabling accommodation of different ball joint stud heights.

By the provision of an adjustable protective cap arrangement in which a cap part may be axially adjusted relative to a main part, the volume of an internal space of the arrangement can be adjusted and adapted to the specific ball joint stud that is currently considered. For instance, if the height of the ball joint stud is relatively low, then the cap part may be moved in an axial direction towards the main part to form a greater overlap and smaller internal volume. In contrast, if the height of the ball joint stud is relatively high, then the cap part may be moved in an axial direction away from the main part to reduce the overlap with the main part and thus increase the internal volume.

The above mentioned terms "axial position", "axially adjusted" and "axial direction", may be considered relative to a cylindrical (r, θ, z) coordinate system. The ball joint stud and the central through hole of the main part both extend in an axial direction, i.e., along a geometrical z-axis. More specifically, the direction of extension of the through hole from one end (through which it can receive the ball joint stud) to the other end of the main part is along the z-axis. The adjustable protective cap arrangement may suitably be symmetrical around the z-axis. The perpendicular direction from the z-axis towards an enveloping surface of the adjustable protective cap arrangement, such as the enveloping surface of the main part, is a radial direction, i.e., along a geometrical r-axis. Drawing a circle around the z-axis can be made in a circumferential direction, i.e., along θ-axis. For instance, the enveloping surface of the main part may suitable be circular and extend in the circumferential direction (although various non-circular shapes of the enveloping surface are also conceivable).

The cap part may suitably have a substantially cylindrical portion, one end of which is open so as to allow a prolongation of the volume formed by the through hole in the main part, the other end of which is closed. The closed end may suitably be closed by a substantially flat end portion. The axial position of the cap part is adjustable relative to the main part. This may be achieved in various ways. For instance, there may be provided locking features at different axial positions along the main part with which a corresponding locking feature of the cap part may engage. Another possibility is a threaded engagement between the cap part and the main part which will be discussed in more detail below. Regardless of how the axial position of the cap part is adjusted relative to the main part, it may suitably be made in such way that the length of an axial overlap between the main part and the cap part is adjusted. For instance, in the case of the above exemplified cylindrical portion, such a cylindrical portion may be adjusted to overlap more or less of the axial extension of the main part. By adjusting the axial position of the cap part relative to the main part, the total available internal volume in the adjustable protective cap arrangement is also changed. The available added internal volume provided by the cap part can be changed by adjusting the axial position of the cap part. Thus, although the internal volume of the main part, as presented by the through hole, may suitably be substantially constant, the added volume provided by the cap part may vary dependent on the amount of overlap between the cap part and the main part.

As mentioned above, the cap part and the main part may suitably be adjusted by means of a threading solution. This is reflected in at least one exemplary embodiment, according to which the end portion of the main part is provided with a first thread, and the cap part is provided with a second thread which is engageable with the first thread, wherein, upon threaded engagement between the cap part and the main part, rotation of the cap part results in adjustment of the height of the protective cap arrangement. A rotational height adjustment based on threaded engagement is very convenient as a stepless adjustment may be made in a simple manner. Furthermore, it is convenient from a manufacturing perspective and is straightforward to assemble. In practice, first the main part may suitably be put in place around the ball joint lock nut and the ball joint stud. Then, the cap part may be connected to the main part by engaging the first and second threads with each other, and finally the cap part may be rotated as much as desired or until further rotation is prevented by the ball joint stud (i.e., the cap part coming into contact with the ball joint stud after having approached it in an axial direction).

According to at least one exemplary embodiment, said first thread is an external thread of the end portion of the main part, wherein said second thread is an internal thread of the cap part. This is advantageous as the internal thread will not compete with an external gripping surface of the cap part. For instance, the enveloping surface of the cap part may suitably be provided with an appropriate gripping structure which may extend along a considerable axial length of the cap part to allow for a good grip for a person mounting and rotating the cap part. Similarly, the internal threads may extend along a substantial axial length of the cap part, thereby allowing for a large adjustability in the axial direction relative to the main part. Nevertheless, it should be understood that general principle of axially adjusting the cap part relative to the main part could also be achieved with other threading combinations. For instance, in at least some exemplary embodiments it would be conceivable to provide the main part with internal threads and the cap part with external threads. In such case, however, the size of the cap part may need to be made larger (longer in the axial extension) to conveniently allow for an easy manual handling of the cap part as well as a large adjustability in the axial direction relative to the main part.

The provision of a gripping surface or gripping structure is at least partly reflected in the following exemplary embodiment. Thus, according to at least one exemplary embodiment, the cap part has an external enveloping surface which is knurled or roughened. Knurled or roughened surfaces are practical from a manufacturing perspective and allows for a good grip to be obtained.

According to at least one exemplary embodiment, the end portion of the main part is a first end portion, wherein the main part further comprises an intermediate portion and a second end portion, the second end portion being axially separated from the first end portion by the intermediate portion, wherein the second end portion has a larger diameter than the intermediate portion and forms a radially extending flange of the main part. By having a radially extending flange, the risk of rust developing on the surface adjacent to the nut is reduced. From the above it can be understood that the adjustable protective cap arrangement may in at least some exemplary embodiments have a substantially hat-shaped configuration. In other words, similarly to a hat, which has a crown and a brim, it can be understood that the second end portion would correspond to the brim of the hat-shape, while the intermediate portion, the first end portion and the thereto mounted cap part would correspond to the crown of the hat-shape.

According to at least one exemplary embodiment, the first end portion has a smaller diameter than the intermediate portion. This is advantageous as it avoids overall bulkiness and reduces material costs.

As explained above, the axial adjustability of the cap part relative to the main part is advantageous as the axial position can be conveniently adapted to the height of the ball joint stud that you want to cover. Apart from the height of the ball joint stud, another dimension that may be considered is the diameter of the ball joint stud, in particular the diameter of a portion of the ball joint stud that will be engaged by the ball joint lock nut. For instance, for a ball joint stud having a relatively large diameter, you may select a ball joint nut of larger diameter, while a ball joint stud having a relatively small diameter may instead be associated with a ball joint nut of smaller diameter. Although one ball joint stud having a substantially greater height than another ball joint stud may have the same diameters at their respective interface with the ball joint lock nut, it is often the case that they will have different diameters. Therefore, in addition to providing the hitherto discussed axial adjustability to accommodate different ball joint stud heights, in the following, some examples will be discussed which also take into account different ball joint stud diameters, or more specifically different ball joint lock nut sizes. For instance, ball joint lock nuts may come in standard sizes such as M18, M20, M22, M24, etc. having different widths (extensions in the radial direction) and different "wrench sizes". The below examples will relate to adjustability with respect to such different sizes. It should, however, be understood that the general principles in this disclosure may be applied to various nut designs and are not limited to be implemented only for hexagonal nuts. A nut-mating structure of the adjustable protective cap may be suitably designed based on the type of nuts that are to be used in the ball joints of interest.

As explained above, the axial adjustability is achieved by decoupling the traditional protective caps into two parts, a main part and a cap part which is axially adjustable relative to the cap part. Similarly, the traditional nut-mating structure may also be decoupled from the main part. Thus, instead of having an integral nut-mating structure in the main part, such a nut-mating structure may suitably be provided in a separate plug-in part that can be inserted into the main part. By having access to different plug-in parts dimensioned to mate with respective differently sized ball joint lock nuts, a person can in each case simply select the appropriate plug-in part and insert it into the main part. Thus, the adjustable protective cap arrangement may comprise a plurality of plug-in parts, although only one of them will is selected and inserted into the main part. As such, the adjustable protective cap arrangement may also be regarded as an adjustable protective cap system, i.e., a system of selectable and combinable components. The system comprises different components to select from, and a person can use those components that are appropriate for the situation that the person is currently facing.

In the following, some examples will initially be discussed in relation to features of single plug-in part. It should, however, be understood that unless stated otherwise and unless it is physically contradictory, any other plug-in part of the adjustable protective cap arrangement may suitably have the same or corresponding features.

Thus, according to at least one exemplary embodiment, the adjustable protective cap arrangement further comprises:

an annular plug-in part which is receivable in the through hole of the main part such that the main part surrounds the plug-in part, wherein the annular plug-in part has an internal surface which is shaped and configured to mate with an external surface of the ball joint lock nut.

According to at least one exemplary embodiment, the annular plug-in part is made of a resilient material, such as a combination of rubber and plastic, and is configured to be press-fitted when inserted into the main part. This is advantageous as it reduces the risk of the main part falling off the plug-in part.

According to at least one exemplary embodiment, the main part has an internal interfacing surface configured to mate with an external interfacing surface of the plug-in part, wherein said interfacing surfaces provide a rotational lock when having been mated. By preventing the main part from rotating relative to the plug-in part, the cap part can conveniently be mounted to and adjusted relative to the stationary main part. For instance, if the cap part is axially adjustable by rotating the cap part (such as by means of a threading engagement as discussed above), the main part will remain still, i.e., not follow the rotation of the cap part, since the cooperating anti-rotation feature with the plug-in part will prevent such entrainment. Hence, the desired axial adjustment can easily be achieved.

According to at least one exemplary embodiment, said internal and external interfacing surfaces are generally circular, wherein one of said internal and external interfacing surfaces is provided with at least one protrusion configured to mate with a corresponding recess in the other one of said internal and external interfacing surfaces. A protrusion-recess engagement provides an effective anti-rotation function. For instance, the protrusion can be on the main part and the recess can be on the plug-in part, or vice versa. It is also conceivable to have a protrusion and a recess on the one and the same component, wherein they will engage with a corresponding recess and protrusion, respectively on the other component. Furthermore, although a single protrusion-recess engagement is enough for providing a rotational lock, it may be advantageous to have two or more such protrusion-recess pairs that engage as they may improve the guiding of the plug-in part into the main part, thereby reducing the risk of inserting the plug-in part somewhat skewed so that it gets stuck and not completely inserted (i.e. the so called “sticky drawer effect”).

According to at least one exemplary embodiment, the internal surface of the annular plug-in part is provided with two diametrically opposed depressions or openings for enabling the plug-in part to be gripped and pulled out from the main part. By simplifying the removal of the plug-in part, if a person discovers that he/she has selected a plug-in part which does not fit the ball joint nut that is to be protected, then he/she may remove it and replace it with a correctly dimensioned plug-in part. Also, in case a person has inserted the plug-in part incorrectly, for-example skewed relative to the main part, he/she may simply pull it out and re-insert it with proper alignment.

According to at least one exemplary embodiment, said annular plug-in part is a first annular plug-in part, the adjustable protective cap arrangement further comprising a second annular plug-in part for allowing a user to select which one of the first and second annular plug-in parts to insert into the main part, wherein the internal surface of the first annular plug-in part is dimensioned to mate with a ball joint nut of a first size and the internal surface of the second annular plug-in part is dimensioned to mate with a ball joint nut of a second size which is different from the first size. Thus, as already explained above, this is advantageous as a user may select the plug-in part that is appropriately dimensioned without having to use another main part. In comparison to making a plurality of main part for differently sized ball joint lock nuts, it is considerably more cost-effective to instead make a selection of plug-in parts. It should be understood that the above example of a first and second plug-in part can be readily expanded to a greater selection. If it is envisaged that ball joint lock nuts of more than two sizes are to be protected, then the adjustable protective cap arrangement may of course have more than two plug-in parts. For instance, it may comprise a third plug-in part, a fourth plug-in part, etc., i.e., any reasonable plurality of plug-in parts dimensioned to mate with respective nut sizes.

According to at least one exemplary embodiment, the first annular plug-in part and the second annular plug-in part have the same external dimension. In other words, they will interface/engage with the main part in the same way. Thus, no additional consideration needs to be taken for how to insert each plug-in part.

According to at least one exemplary embodiment, the first annular plug-in part has a first maximum wall thickness, wherein the second annular plug-in part has a second maximum wall thickness which is different from said first maximum wall thickness. This is particularly advantageous if they have the same external dimensions. By providing different wall thicknesses, the internal dimensions can be adapted to respective nut sizes.

According to a second aspect of the present disclosure, there is provided a vehicle, such as a heavy-duty vehicle, comprising an assembled adjustable protective cap arrangement according to the above-discussed first aspect of this disclosure, including any exemplary embodiment thereof. The advantages of the vehicle of the second aspect are largely analogous to the advantages of the first aspect, including any exemplary embodiment thereof.

Generally, all terms used in the claims are to be interpreted according to their ordinary meaning in the technical field, unless explicitly defined otherwise herein. All references to “a/an/the portion, element, component, arrangement, device, means, etc.” are to be interpreted openly as referring to at least one instance of the portion, element, component, arrangement, device, means, etc., unless explicitly stated otherwise. Further features of, and advantages with, the teachings of the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
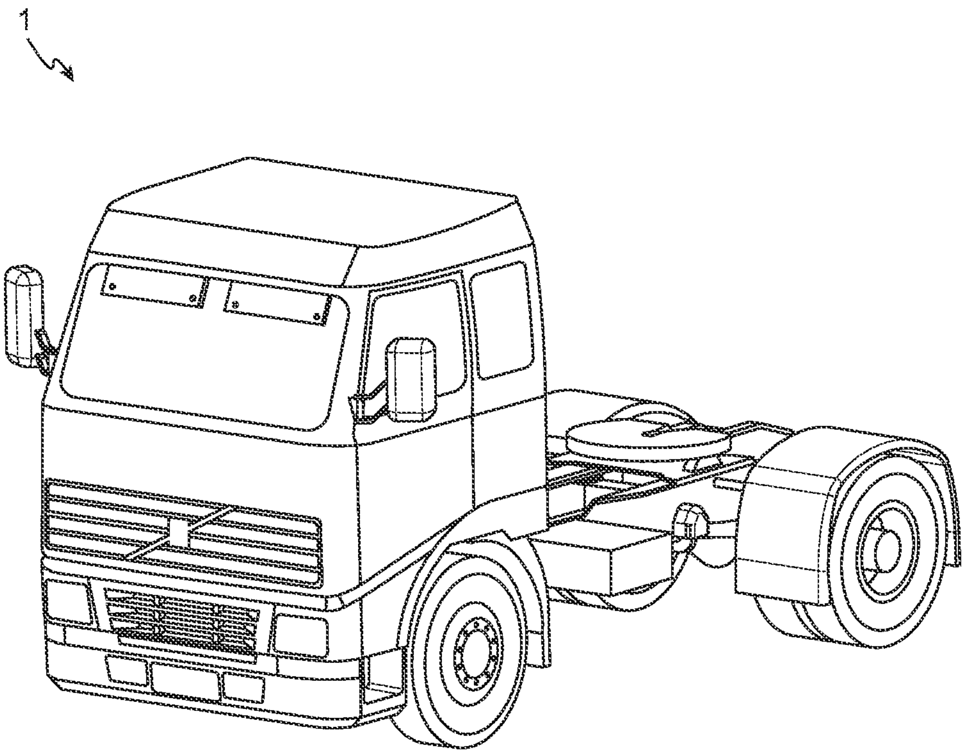
FIG. 1 illustrates a vehicle according to at least one exemplary embodiment of the present disclosure.

The general inventive concept will now be described more fully hereinafter with reference to the accompanying drawings, in which certain aspects are shown. The general inventive concept may, however, be embodied in many different forms and should not be construed as limited to the embodiments and aspects set forth herein; rather, the embodiments are provided by way of example so that this disclosure will be thorough and complete, and will fully convey the scope to those skilled in the art. Accordingly, it is to be understood that the present general inventive concept is not limited to the embodiments described herein and illustrated in the drawings; rather, the skilled person will recognize that many changes and modifications may be made within the scope of the appended claims. Like reference numerals refer to like elements throughout the description.

FIG. 1 illustrates a vehicle 1 according to at least one exemplary embodiment of the present disclosure. The exemplary illustration in FIG. 1 shows a heavy-duty vehicle 1. More specifically FIG. 1 shows a vehicle in the form of a tractor unit for towing a trailer unit (not shown), which together may make up a semitrailer vehicle. However, the teachings of the present disclosure are applicable to other types of vehicles as well. For instance, the vehicle may be a different type of vehicle for cargo transport, such as a truck, or a truck with a dolly unit arranged to tow a trailer unit, etc. Other exemplary vehicles include buses, construction equipment, and even passenger cars. The vehicle 1 may be operated by a driver or it may be an autonomous vehicle.

The vehicle 1 may comprise an adjustable protective cap arrangement of the general inventive concept, some examples of which will be discussed in relation to the other drawing figures.

Figure 2:
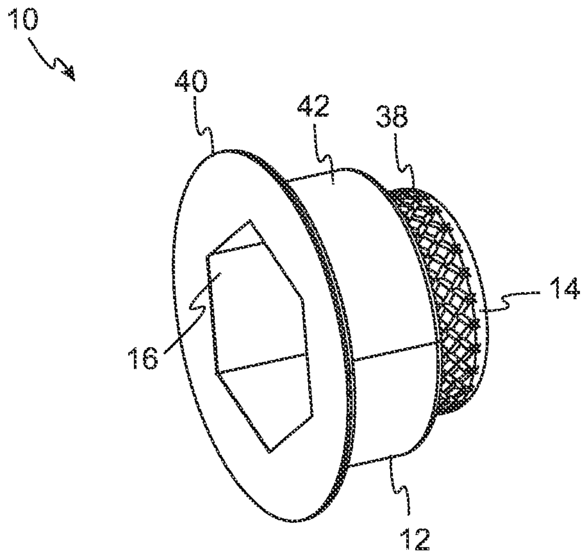
FIG. 2 illustrates an adjustable protective cap arrangement according to at least one exemplary embodiment of the present disclosure, in an assembled state.

FIG. 2 illustrates an adjustable protective cap arrangement 10 according to at least one exemplary embodiment of the present disclosure, in an assembled state. The adjustable protective cap arrangement 10 is intended to cover a ball joint in a vehicle, such as the vehicle 1 in FIG. 1.

Figure 3:
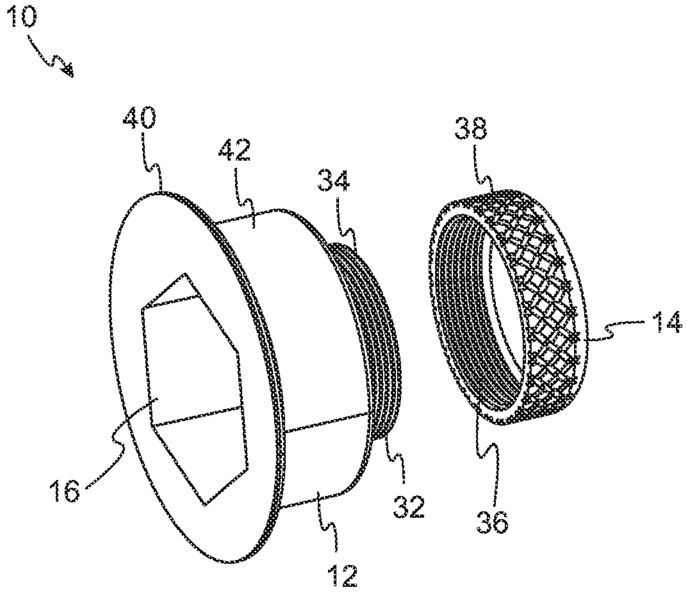
FIG. 3 illustrates the adjustable protective cap arrangement of FIG. 2 in a disassembled state.

FIG. 3 illustrates the adjustable protective cap arrangement 10 of FIG. 2 in a disassembled state. As can be seen in both FIGS. 2-3, the adjustable protective cap arrangement 10 comprises a main part 12 and a cap part 14. The main part 12 is provided with an internal nut-mating structure 16, such as a hexagonal structure. FIGS. 2-3 thus illustrate that the nut-mating structure 16 may form an integral portion of the main part 12. However, in other exemplary embodiments the nut-mating structure may be provided as a plug-in part. This is illustrated in FIGS. 4-7.

Figure 4:
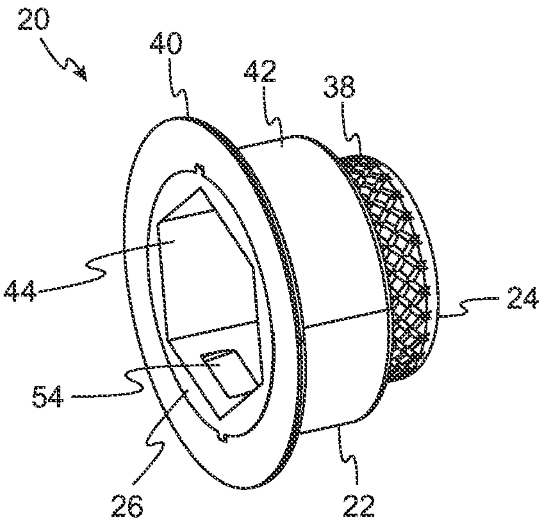
FIGS. 4-7 illustrate an adjustable protective cap arrangement according to at least another exemplary embodiment.
Figure 5:
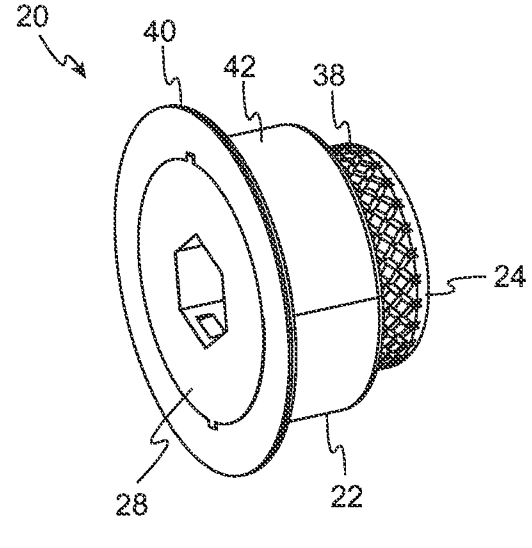
Figure 6:
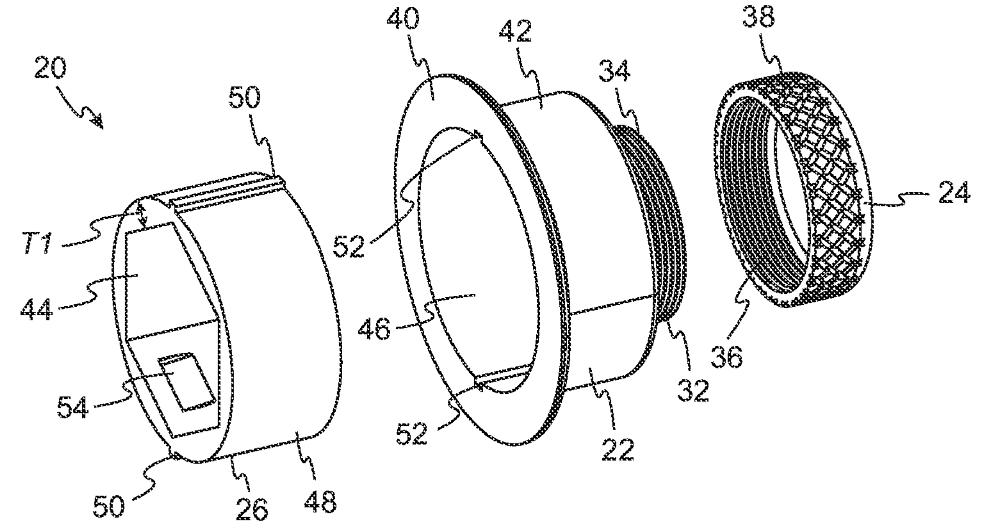
Figure 7:
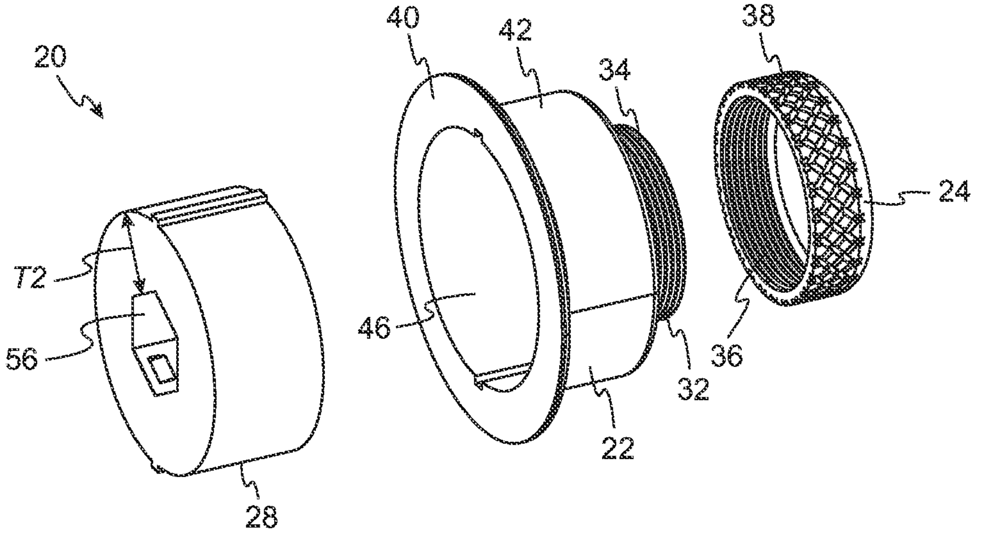

Thus, FIGS. 4-7 illustrate an adjustable protective cap arrangement 20 according to at least another exemplary embodiment. The adjustable protective cap arrangement 20 comprises a main part 22 and a cap part 24. The cap part 24 may, if desired, be identical to the cap part 14 in FIGS. 2-3, but may of course be designed differently as well. In contrast to the exemplary embodiment of FIGS. 2-3, the exemplary embodiment of FIGS. 4-7 illustrates that an adjustable protective cap arrangement 20 may comprise several plug-in parts 26, 28 to choose from, each one with a differently sized nut-mating structure. Thus, depending on the size of the nut to be mated with, the appropriate plug-in part 26, 28 may be inserted into the main part 22. In the present illustrations, FIGS. 4 and 6 show a first plug-in part 26 which is configured to mate with a relatively large sized nut, while FIGS. 5 and 7 show a second plug-in part 28 which is configured to mate with a relatively small sized nut. FIGS. 4-7 will be discussed in more detail later in this disclosure.

Figure 8:
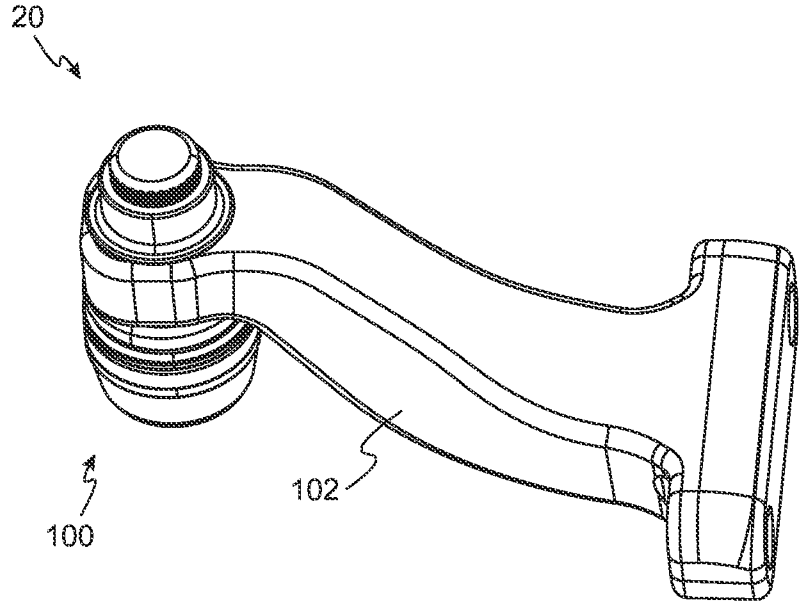
FIGS. 8-9 illustrate an adjustable protective cap arrangement according to at least one exemplary embodiment of the present disclosure, wherein the adjustable protective cap arrangement is mounted on a ball joint in a vehicle.
Figure 9:
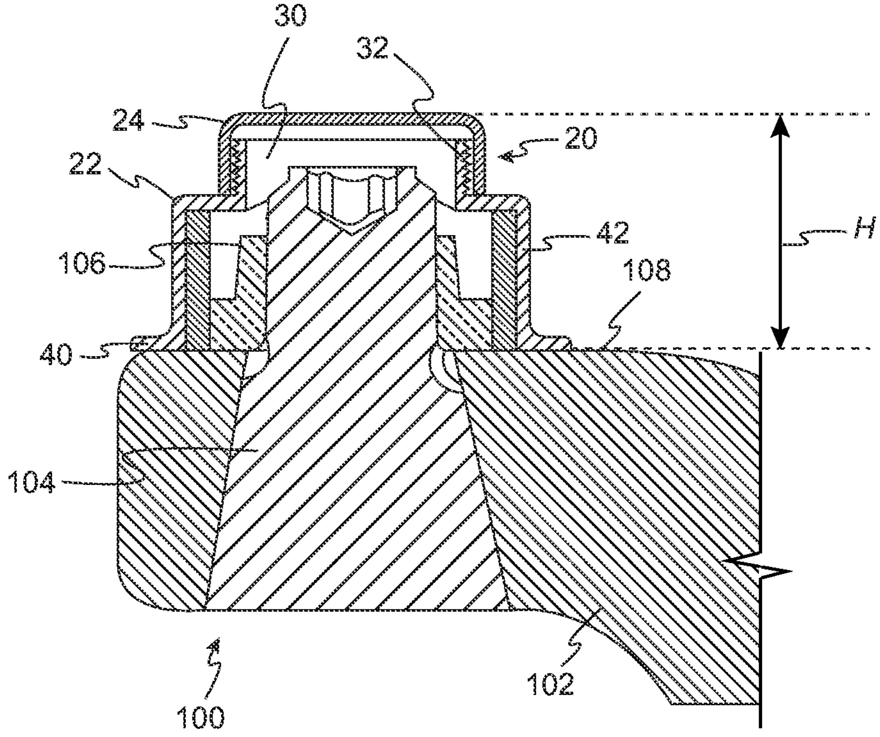

Turning now to FIGS. 8-9, these drawing figures illustrate an adjustable protective cap arrangement, such as the arrangement 20 and the combination of components of FIGS. 4 and 6. The adjustable protective cap arrangement 20 is mounted on a ball joint 100 in a vehicle, such as the vehicle 1 in FIG. 1. FIG. 8 illustrates a perspective view of the adjustable protective cap arrangement 20 mounted to the ball joint 100 at a steering linkage arm 102 of the vehicle. FIG. 9 is a close-up cross-sectional view. As mentioned above, the adjustable protective cap arrangement 20 seen in FIG. 9 may, for example, be the three-part combination shown in FIGS. 4 and 6, however, a two-part combination shown in FIGS. 2-3 could of course instead have been applied to the ball joint 100.

With reference to FIG. 9, a ball joint 100 normally comprises a ball joint stud 104 and a ball joint lock nut 106. The ball joint lock nut 106 may for example be secured to the ball joint stud 104 by means of cooperating threads (not illustrated). The ball joint stud 104 extends through the steering linkage arm 102. The ball joint lock nut 106 is provided around the ball joint stud 104 and is in contact with a surface 108 of the steering linkage arm 102 where the ball joint stud 104 protrudes (in this illustration it is an upper surface 108). Regardless of the adjustable protective cap arrangement being a two-part combination shown in FIG. 2-3 (integral nut-mating structure) or a three-part combination shown in FIGS. 4-7 (nut-mating structure in plug-in part), the main part 12, 22 is configured to surround the ball joint lock nut 106. The main part 12, 22 has a central through hole 30 (see FIG. 9) which extends through the main part 12, 22 and which is configured to receive a portion of the ball joint stud 104 projecting through and beyond the ball joint lock nut 106.

Ball joint studs may come in different heights. Rather than providing a plurality of different protective caps of different heights for accommodating differently sized ball joint studs, according to the general teachings herein (including the exemplary embodiments of FIGS. 2-7), an adjustable protective cap arrangement 10, 20 is provided with a cap part 14, 24 which is adjustable relative to the main part 12, 22. More specifically, the cap part 14, 24 is configured to be connected to an end portion 32 of the main part 12, 22 to form a closed end of the adjustable protective cap arrangement 10, 20, as can be clearly seen for the adjustable protective cap arrangement 20 shown in FIG. 9. When the cap part 14, 24 has been connected to the main part 12, 22, the height H of the protective cap arrangement 10, 20 is adjustable by adjustment of the axial position of the cap part 14, 24 relative to the main part 12, 22, thereby enabling accommodation of different ball joint stud heights. For instance, if the protective cap arrangement 20 in FIG. 9 would instead be placed on a ball joint having a ball joint stud of greater height, the cap part 24 could be axially adjusted and moved (upwardly in the figure) in a direction away from the main part 22 (but still remaining in contact with the main part 22).

As illustrated in FIG. 9, but more clearly seen in FIGS. 3, 6 and 7, the adjustability of the cap part 14, 24 relative to the main part 12, 22 may in at least some exemplary embodiments be provided by cooperating threads. The end portion 32 of the main part 12, 22 may thus be provided with a first thread 34, and the cap part 14, 24 may be provided with a second thread 36 which is engageable with the first thread 34 (see FIGS. 3, 6 and 7). Upon threaded engagement between the cap part 14, 24 and the main part 12, 22, rotation of the cap part 14, 24 results in adjustment of the height H of the protective cap arrangement 10, 20. As illustrated in the drawing figures the first thread 34 may be an external thread of the end portion 32 of the main part 12, 22, while the second thread 36 may be an internal thread of the cap part 14, 24. In other exemplary embodiments it is, of course conceivable, to have the threads the other way around, i.e. externally of the cap part 14, 24 and internally of the main part 12, 22.

As best seen in FIGS. 2-7 the cap part 14, 24 may have an external enveloping surface 38 which is knurled. This provides a good grip when adjusting the axial position of the cap part 14, 24. Another example for providing a good grip may be to roughen the surface, such as by blasting, etching, etc.

As can be clearly seen in FIG. 9 (and also in FIGS. 3, 6 and 7) the end portion 32 of the main part 12, 22 is a first end portion 32. The main part 12, 22 further comprises a second end portion 40 which is axially separated from the first end portion 32 by an intermediate portion 42. The second end portion 40 has a larger diameter than the intermediate portion 42 and forms a radially extending flange of the main part 12, 22. As seen in FIG. 9, the flange (i.e., the second end portion 40) covers a part of the surface 108 on which the ball joint lock nut 106 rests. In particular, the second end portion 40 forms a circular contact with said surface 108. This circular contact encircles the ball joint lock nut 106 and provides rust protection to the part of the surface 108 adjacent the ball joint lock nut 106 (and thus also to the ball joint lock nut 106). It should be understood that the central through hole 30 which extends through the main part 12, 22, extends all the way through the axial extension of the main part 12, 22, from end to end. Thus, the through hole 30 extends through the first end portion 32, the intermediate portion 42 and the second end portion 40.

As can be clearly seen in FIG. 9 (and also in FIGS. 3, 6 and 7) the first end portion 32 may suitably have a smaller diameter than the intermediate portion 42, thereby avoiding unnecessary bulkiness.

Turning to the exemplary embodiment of FIGS. 4-7, which will now be discussed in more detail. As illustrated in FIGS. 4 and 6, the adjustable protective cap arrangement 20 comprises an annular plug-in part 26 which is receivable in the through hole of the main part 22 such that the main part 22 surrounds the plug-in part 26. The plug-in part 26 has an internal surface 44 which is shaped and configured to mate with an external surface of the ball joint lock nut 106. The annular plug-in part 26 may suitably be made of a resilient material such as a combination of rubber and plastic, and may be configured to be press-fitted when inserted into the main part 22.

As clearly seen in FIG. 6, the main part 22 has an internal interfacing surface 46 which is configured to mate with an external interfacing surface 48 of the plug-in part 26. These two interfacing surfaces 46, 48 are designed to provide a rotational lock when the plug-in part 26 has been inserted into the main part 22. In this particular example, the internal and external interfacing surfaces 46, 48 are generally circular. The external interfacing surface 48 of the plug-in part 26 is provided with at least one protrusion 50 (two protrusions are shown in FIG. 6) which is configured to mate with a corresponding recess 52 in the internal surface 46 of the main part 22. Thus, when the protrusion 50 engages the recess 522, the plug-in part 26 is prevented from rotating relative to the main part 22. It should be noted that the illustrated protrusion/recess configuration is just one example. In other exemplary embodiments, the internal surface 46 of the main part 22 may be provided with at least one protrusion and the external surface 48 of the plug-in part 26 may be provided with a mating recess. In either case, it is noted that such an indexing element (be it in the form of a protrusion 50 or a recess 52), may suitably extend along an external enveloping surface of the plug-in part 26. Similarly, such an indexing element may suitably extend internally along the second end portion 40 and intermediate portion 42 of the main part 22. Although the illustrated protrusions 50 and recesses 52 have been illustrated as elongated protrusion 50 and recesses 52 other shapes and lengths are also conceivable as long as they provide an anti-rotation function.

As can be seen in FIGS. 4 and 6, the internal surface 44 of the plug-in part 26 is provided with a cut-out, opening or depression 54. Although not visible in the drawing figures, there is provided another such cut-out opening or depression oppositely to the one illustrated. Thus, the internal surface 44 of the plug-in part 26 is provided with two diametrically opposed cut-outs, openings or depressions 54. These enable the plug-in part 26 to be gripped and pulled out from the main part 22. For instance, if a person realizes the plug-in part 26 which has been inserted into the main part 22 is of the wrong dimension and will not fit a ball joint lock nut as intended, then he/she may conveniently grip the plug-in part 26 at said depressions 54 and pull it out from the main part 22, and then insert a correctly dimensioned plug-in part into the main part 22.

Such possibility to select from the differently dimensioned plug-in parts is illustrated in FIGS. 4-7. The adjustable protective cap arrangement 20 comprises one main part 22 and one cap part 24, which is the same in each one of FIGS. 4-7. However, the adjustable protective cap arrangement 20 also comprises at least two plug-in parts 26, 28 to choose from, i.e. a first plug-in part 26 in FIGS. 4 and 6, and a second plug-in part 28 in FIGS. 5 and 7. In practice, the adjustable protective cap arrangement 20 may suitably have one plug-in part for each possible ball joint lock nut size that may be available. Just as an example, frequently used ball joint lock nut sizes are M18, M20, M22 and M24. In such case, the adjustable protective cap arrangement 20 may suitably comprise four different plug-in parts to choose from one, one for each size.

As explained above, the annular plug-in part 26 in FIGS. 4 and 6 is a first annular plug-in part 26 of the adjustable protective cap arrangement 20. The adjustable protective cap arrangement 20 further comprises a second plug-in part 28 (FIGS. 5 and 7) for allowing a user to select which one of the first and second annular plug-in parts 26, 28 to insert into the main part 22. The internal surface 44 of the first annular plug-in part is dimensioned to mate with a ball joint nut of a first size and the internal surface 56 of the second annular plug-in part 28 is dimensioned to mate with a ball joint nut of a second size which is different from the first size. From FIGS. 4-7, it can be understood that in the illustrated example, the first size is larger than the second size (the large size difference that has been illustrated is just for reasons of clarity, and should not be regarded as representing precise real measures).

As can be seen in FIGS. 4-7, since each one of the first plug-in part 26 and the second plug-in part 28 should be able to be inserted into the main part 22, they may suitably have the same external dimensions, so that each one of the plug-in parts 26, 28 may fit equally well within the main part 22.

Since the external dimensions of the first and second plug-in parts 26, 28 may suitably be the same, and since the internal dimensions of the first and second plug-in parts 26, 28 differ, the maximum wall thickness of plug-in parts 26, 28 will also differ. In the illustrated example, the first annular plug-in part 26 has a first maximum wall thickness T1, and the second annular plug-in part has a second maximum wall thickness T2 which is different (larger than) said first maximum wall thickness T1.

The invention claimed is:

1. An adjustable protective cap arrangement for a ball joint in a vehicle, comprising:

a main part configured to surround a ball joint lock nut, the main part having a central through hole which extends axially through the main part and which is configured to receive a portion of a ball joint stud projecting through and beyond the ball joint lock nut, a cap part configured to be connected to an end portion of the main part to form a closed end of the protective cap arrangement, and an annular plug-in part which is receivable in the through hole of the main part such that the main part surrounds the plug-in part, wherein the annular plug-in part has an internal surface which is shaped and configured to mate with an external surface of the ball joint lock nut, wherein, when the cap part has been connected to the main part, the height of the protective cap arrangement is adjustable by adjustment of the axial position of the cap part relative to the main part, thereby enabling accommodation of different ball joint stud heights;

wherein the annular plug-in part is receivable in the through hole of the main part in an axial direction of the main part.

2. The adjustable protective cap arrangement of claim 1, wherein:

the end portion of the main part is provided with a first thread, and the cap part is provided with a second thread which is engageable with the first thread, wherein, upon threaded engagement between the cap part and the main part, rotation of the cap part results in adjustment of the height of the protective cap arrangement.

3. The adjustable protective cap arrangement of claim 2, wherein:

the first thread is an external thread of the end portion of the main part, and the second thread is an internal thread of the cap part.

4. The adjustable protective cap arrangement of claim 1, wherein the cap part has an external enveloping surface which is knurled or roughened.

5. The adjustable protective cap arrangement of claim 1, wherein:

the end portion of the main part is a first end portion, the main part further comprises an intermediate portion and a second end portion, the second end portion being axially separated from the first end portion by the intermediate portion, and the second end portion has a larger diameter than the intermediate portion and forms a radially extending flange of the main part.

6. The adjustable protective cap arrangement of claim 5, wherein the first end portion has a smaller diameter than the intermediate portion.

7. The adjustable protective cap arrangement of claim 1, wherein the annular plug-in part is made of a resilient material and is configured to be press-fitted when inserted into the main part.

8. The adjustable protective cap arrangement of claim 1, wherein:

the main part has an internal interfacing surface configured to mate with an external interfacing surface of the plug-in part, and the interfacing surfaces provide a rotational lock when mated.

9. The adjustable protective cap arrangement of claim 8, wherein:

the internal and external interfacing surfaces are generally circular, and one of the internal and external interfacing surfaces is provided with at least one protrusion configured to mate with a corresponding recess in the other one of the internal and external interfacing surfaces.

10. The adjustable protective cap arrangement of claim 1, wherein the internal surface of the annular plug-in part is provided with two diametrically opposed depressions or openings for enabling the plug-in part to be gripped and pulled out from the main part.

11. The adjustable protective cap arrangement of claim 1, wherein:

the annular plug-in part is a first annular plug-in part, the adjustable protective cap arrangement further comprises a second annular plug-in part for allowing a user to select which one of the first and second annular plug-in parts to insert into the main part, and the internal surface of the first annular plug-in part is dimensioned to mate with a ball joint nut of a first size and the internal surface of the second annular plug-in part is dimensioned to mate with a ball joint nut of a second size which is different from the first size.

12. The adjustable protective cap arrangement of claim 11, wherein the first annular plug-in part and the second annular plug-in part have the same external dimension.

13. The adjustable protective cap arrangement of claim 11, wherein:

the first annular plug-in part has a first maximum wall thickness, and the second annular plug-in part has a second maximum wall thickness which is different from the first maximum wall thickness.

14. A vehicle comprising the assembled adjustable protective cap arrangement of claim 1.

* * * * *